United States Patent [19]

Watanabe et al.

[11] Patent Number: 4,919,926

[45] Date of Patent: Apr. 24, 1990

[54] INSECT ATTRACTION PREVENTER

[75] Inventors: Yosuke Watanabe, Chiba; Yuji Kawakami, Kodaira; Koichiro Kikuchi, Tokorozawa; Yoshiyuki Ogawa, Chiba; Hiroshi Sato, Funabashi, all of Japan

[73] Assignees: Ikari Corporation; Taisei Kako Co., Ltd., both of Tokyo, Japan

[21] Appl. No.: 124,082

[22] Filed: Nov. 23, 1987

[30] Foreign Application Priority Data

Nov. 27, 1986 [JP] Japan .................................. 61-280873

[51] Int. Cl.$^5$ ..................... A61K 31/78; A61K 31/74; F21V 19/00; B32B 17/10
[52] U.S. Cl. ......................................... 424/81; 424/78; 424/405; 424/84; 424/DIG. 10; 252/589; 252/582; 428/441; 428/442; 427/168
[58] Field of Search ................ 428/441, 442; 427/168; 43/112; 424/78, 81, 84, DIG. 10, 411, 405; 252/589, 582

[56] References Cited

U.S. PATENT DOCUMENTS

| 4,011,236 | 3/1977 | Grier | 546/104 |
| 4,320,939 | 3/1982 | Mueller | 252/582 |
| 4,783,142 | 11/1988 | Mutzhas | 252/589 |

OTHER PUBLICATIONS

Haller, IBM Bulletin, vol. 15, #2, Jul. '72.

*Primary Examiner*—Joseph L. Schofer
*Assistant Examiner*—Carmen B. Pili-Curtis
*Attorney, Agent, or Firm*—Fleit, Jacobson, Cohn, Price, Holman & Stern

[57] ABSTRACT

In order to prevent an evil caused by flying insects, an insect attraction protectant containing a light shielding agent which absorbs the light ranging from 200 to 500 nm in wave length is used to coat a transparent portion of a window glass and the like.

Further, the above insect attraction protectant comprises a transparent synthetic resin such as an acrylic resin, or the like.

The light shielding agent comprises an ultraviolet ray absorbent, a mixture of the ultraviolet ray absorbent and a dye, or a dye only.

10 Claims, 3 Drawing Sheets

4,919,926

INSECT ATTRACTION PREVENTER

BACKGROUND OF THE INVENTION

This invention relates to insect attraction protectants which prevent positively the flight of harmful insects attracted to a light by intercepting the transmission of the light having wave lengths outwardly to which said harmful insects are sensible.

An evil caused by flying harmful insects ranges widely over various industrial fields.

The examples are as follows:

1. An accident caused by mix of foreign matters to a product in a food factory, is a great problem from the point of the quality control. Among the mixed foreign matters, the most numerous cases are the mixing of various kinds of insects.

Especially, the mix of insects able to fly such as flies, mosquitos and the like into the product is the most numerous causes of claims to the products in preparing works.

2. Many works have been recently located in the suburbs, whereby harmful insects to the agriculture such as rice insects, leafhoppers, and the like which come flying from paddy fields, plowed fields, etc. in the circumferences thereof fly to the works being attracted by lamplights. This causes the mix to the products in many cases.

3. The harmful insects attracted to the lamplight fly to window glasses at villas, mountain villas, drive-ins and restaurants in suburbs in the evening. This gives unpreferable impression to customers. Particularly, at a breeding season of the chironomid midges and the termites, they come flying with number of thousand to million to gather on show windows and the like, thereby exciting a bad feeling to persons and interfering with a business in some cases.

4. The chironomid midges and moths come flying to show windows, telephone boxes, street lamps, express highway lamps not only in suburbs, but also in cities. This is ugly and unpleasant.

In order to prevent such flying harmful insects, the following measures have been conventionally considered:

The extermination by insecticide or light trap; the capture by adhesive tape, etc; electric shocker; the invasive prevention by aircurtain; the invasive prevention by stripped plastic curtain; the invasive prevention by window screen and others.

However, these techniques lay the important points on the prevention of harmful flying insects. By this, there occurs such problem as an insufficient preventive effect or a secondary pollution due to a product used for extermination.

First, although the invasion of the harmful insects into a room can be prevented to some extent by an insect barrier, the flight and sittting of the insects to the window the window glass, etc. can not be prevented. The harmful insects come flying around a building and invade into the room through a very small clearance, especially through a small clearance under a rail of an aluminum sash. Accordingly, the insect avoiding effect thereof is low.

Further, a method of exterminating the coming insects with insecticide induces the secondary pollution due to the toxicity of the insecticide, the safety to the product, the environmental pollution, etc. Furthermore, in the conventional insecticide lamp, the illumination in the room becomes to be a colored light since the illumination is treated to be repellent, thereby hindering the amenity of the residence in numerous cases.

SUMMARY OF THE INVENTION

This invention is performed in view of the above reasons and its object is to provide an insect attraction proctant based on the conception to prevent the evil due to flying insects by intercepting the flight of the flying insects.

After investigating this matter earnestly, the inventors have completed this invention in which the flight of a numerous of objective insects is avoidable without deteriorating the present residential environment by shielding the light of special wave lengths.

This invention is characterized by the fact that a light shielding agent which absorbs the wave length within a range of 200 to 500 nm is included in a transparent synthetic resin.

Figure 1:
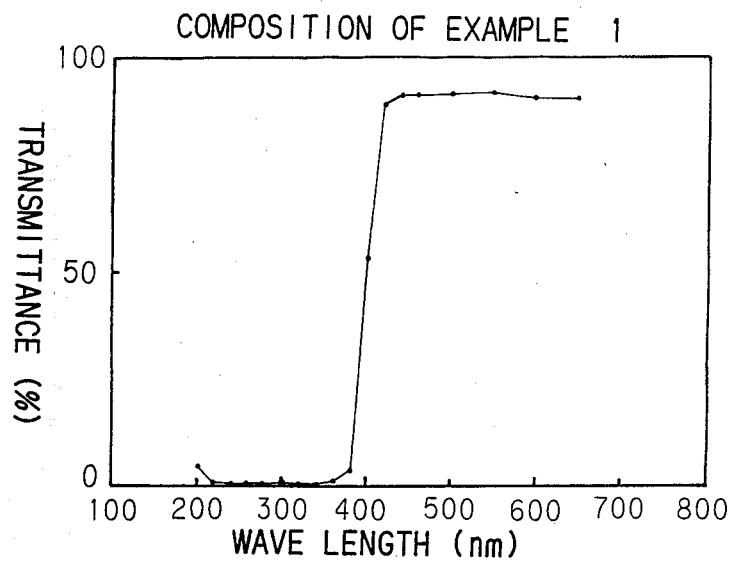
FIGS. 1-5 are graphs which indicate the results of the measurement of the transmission with respect to the insect attraction protectant obtained by the examples of this invention.

Any of the figures takes the wave length as an axis of abscissa and takes the transmission as an axis of ordinate.

DETAILED DESCRIPTION OF THE INVENTION

This invention is characterized in that the light shielding agent which absorbs the light in a range of 200 to 500 nm of wave length is contained in a transparent synthetic resin as described above.

This reason is due to the fact that the insect attraction protectant containing the light shielding agent which absorbs the light over 500 nm in wave length occurs not only the decrease of the transparency to deteriorate the residential environment, but also can not improve the insect attraction protective effect even if the light over 500 nm in wave length is cut when it is used to coat on the transparent materials such as window glass, etc. Further, the light below 200 nm in wave length is originally low in insect attraction protective effect.

As light shielding agents, are used an agent comprising only ultraviolet-ray absorber, a mixture of an ultraviolet-ray absorber and a dye, or a only dye. As an ultraviolet-ray absorber, is selected, for example, "Tinuvin 326" (prepared by Chiba-Geigy). As dyes, for instance, are used "Zapon yellow 073", a yellow dye (prepared by BASF), "Valiosol 3808T" a black dye (prepared by Orient Chemicals), and "Valiosol 3306T", a red dye (Orient Chemicals).

This invention is prepared by mixing any of these light shielding agents comprising an ultraviolet-ray absorber and a dye into a transparent synthetic resin. As a synthetic resin, any of the conventional publicly known one, such as an acrylic resin, a vinyl chrolide or the like, may be used as far as the residential environment is not deteriorated due to a remarkable decrease of the transparency of the transparent parent body or material such as the window glass and the like when said synthetic resin is coated on the window glass etc. Among them, the use of acrylic resin which is excellent in optical characteristics is desirable. Further, it is no problem whether it is colored or not colored. It is easily performed to mix the light shielding agent into the synthetic resin by the same method as the conventional mixing means to said synthetic resin. Further, the insect attraction protectants of this invention can adopt various kinds of forms such as plates, films, viscous solutions, aerosol or the like. In case of the plate or the film, since it constitutes a transparent covered body, it is used as it is or used being covered upon the objective material such as a window glass. Further, in case of the viscous solution or the aerosol, it is used after coating it on the surface of the objective to form a transparent film or spraying it on the surface of the objective respectively.

Any of the objectives which can attracts the insects by transmitting the light outward such as the outer shell of the show window and an illuminator other than the window glass, etc. can be correspondent to this.

According to this invention, the light having 200 to 500 nm in wave length is cut from the transmitted light from the light source to the outward through the objective by covering the surface of the objective or using itself as the objective of the window glass and the like as described above. By this, the insects attraction effect due to the above transmission of light decreases and can prevent the insect attraction. However, the window glass and the show window, etc. are not injured the conventional function at all by this.

Further, these window glass and show window display the secondary effect such as that the outer scenery is distinctly visible by the filtering action of the treatment material or merchandises and others in a room last long in use because the ultraviolet rays in the sun light are cut.

The embodiment of this invention will be described as follows with reference to the examples.

If illustrates the combined composition of this invention, it is examples 1 to 6. The percent of the combined composition shows a weight percent.

EXAMPLE 1 (NON-COLORED VISCOUS SOLUTION)

transparent acrylic copolymer resin solution having 48.2 poise of viscosity (25° C.) hereinafter referred to as "synthetic resin 1": 25.0%
Tinuvin 326 (uv absorbent): 0.8%
organic solvent: 74.2%

The above organic solvent contains 3-methoxy-butyl acetate, MEK, MIBK, etc. The same so with the following examples.

EXAMPLE 2 (COLORED VISCOUS SOLUTION)

transparent acrylic resin solution having 28 poise of viscosity (25° C.): 23.8%
Zapon yellow 073 (yellow dye): 0.32%
Valiosol 3808T (black dye): 0.48%
Tinuvin 326 (uv absorbent): 1.00%
organic solvent: 74.9%

EXAMPLE 3 (COLORED VISCOUS SOLUTION )

synthetic resin (1): 24.0%
Valiasol 3306T (red dye): 0.4%
Tinuvin 326 (uv absorbent): 1.0%
organic solvent: 74.6%

EXAMPLE 4 (COLORED VISCOUS SOLUTION)

synthetic resin (1): 23.0%
Zapon yellow 073 (yellow dye): 0.32%
Valiosol 3808T (black dye): 0.48%
organic solvent: 75.2%

EXAMPLE 5 (COLORED VISCOUS SOLUTION)

synthetic resin (1): 25.0%
Tinuvin 326 (uv absorvent): 1.0%
Zapon yellow 073 (yellow dye): 0.32%
organic solvent: 74.68%

EXAMPLE 6 (AEROSOL)

Into a can having 350 ml of capacity is added 199.5 g of each composition of examples 1 to 5 and 59.4 g of dimethyl ether (propellant) respectively to aerosolate.

Figure 2:
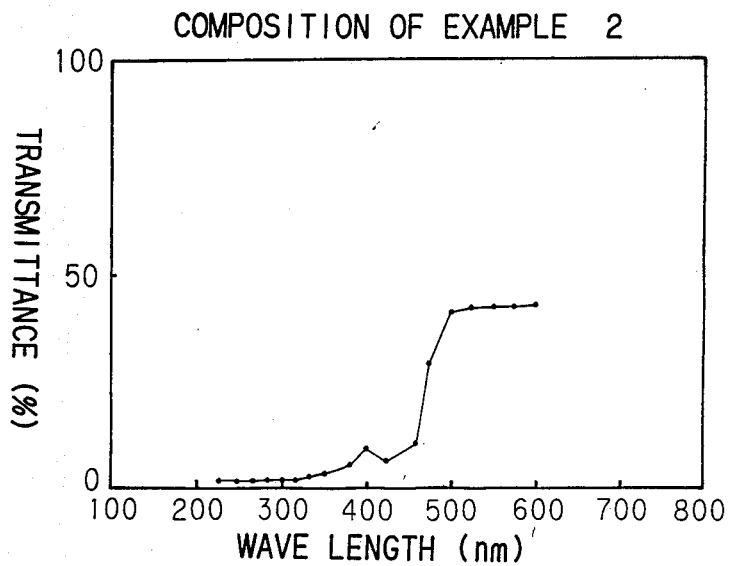
Figure 3:
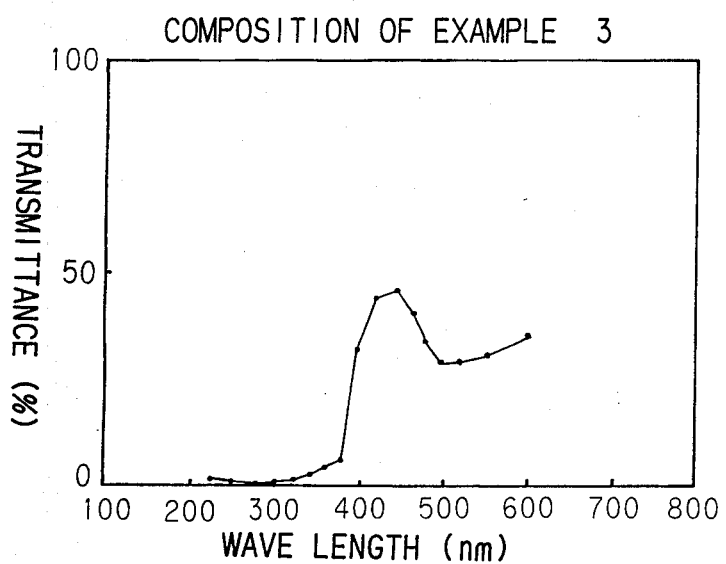
Figure 4:
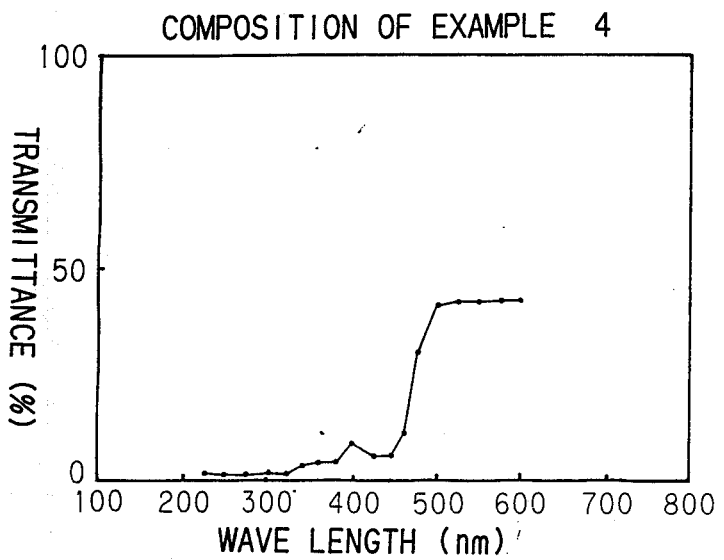
Figure 5:
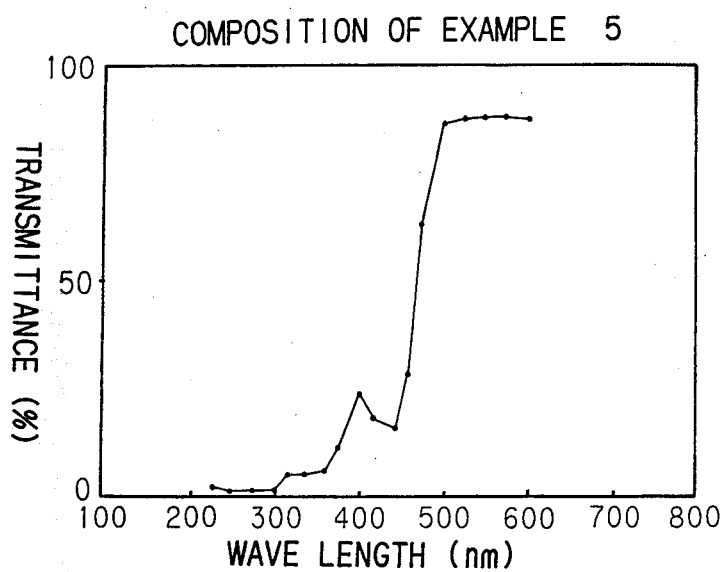

After the measurement of the transmittance with respect to the compositions of the above examples 1 to 5, the results are obtained as shown in FIG. 1 to FIG. 5. As a result, it is found that in examples 1 to 5, the light having 200 to 500 nm of wave length is absorbed. The measurement of this transmittance is performed by the following method.

Each sample of the compositions shown in examples 1 to 5 coated on the surface of a glass plate with a fixed thickness (2μ) is cut to a size, about 1.3 cm×4.5 cm, and then make it to stick on the wall of a quartz glass cell of an ultraviolet spectro-photometer by pressing it with water. Then, the transmittance is measured by an ultraviolet spectro-photometer after adding deionized water in the cell. As a referece, an amount of the transmittance wherein the deionized water is added, is determined 100%.

Further, an effective test of the composition will be described as follows.

Field test

Place: upper stream of river Minami Aki, Tokyo, Japan

Period: May and June, 1986

Test apparatus: A test apparatus is a rectangular parallelopiped box equipped with a 10W white light fluorescent lamp at the inside thereof. To each of 3 side walls of the surrounding four side walls is formed an upper and a lower window portions into which a test piece (70×150×2 mm) can be inserted. The number of the formed window portion is 6 in total per one box.

Test pieces: Six pieces of transparent glass having 70×150×2 mm in size on which film are formed by coating a kind of compositions of examples 1 to 5 to one side of said transparent glass, are prepared for every compositions. Further, as a control, 6 piece of non-treated transparent glasses having 70×150×2 mm in size are also prepared.

Marketing Insect Avoid Fluorescent Lamp: This is on the market as a colored fluorescent lamp or an insect avoiding fluorescent lamp. This is 10W or 20W of pure yellow or transparent fluorescent lamp coated monochromatic fluorescent substance or light absorbent on a colored bulb. It is widely used for a safety light in a semi-conductor work where sensitive materials are treated or for insect avoiding in an orchard.

Method: Six test apparatus of the same kind are inserted to one test plant, said test apparatus being arranged straightly on a path through a forest at intervals of 10 m. The arranged order is at random, and any of the test plant is considered so that the condition may be uniform.

Further, the fluorescent lamp in the apparatus is lighted for one hour per one test in each time zone of the following sections; 19:40 to 20:40, 20:50 to 21:50, 21:50 to 22:50. The number of insects (numbers of insect attracted) attracted by this lighting is calculated by the number of insects captured on the adhesive sheet arranged one by one at both sides of each test apparatus.

Results: The results of this test are shown in the following table.

In this table, "the number of insect attracted" means an average value based on the test results of 3 times.

Further, the percent of the insect attraction protectants is a value calculated by the following formula 1 - (number of insect attracted)/(number of insect attracted by control apparatus) $\times 100$

| Control Apparatus | | Number of Insect Attracted | Percent of the Insect Attraction Avoiding |
|---|---|---|---|
| Control | | 930 | 0% |
| This Invention | example 1 | 240 | 74.2% |
| | example 2 | 98 | 89.5% |
| | example 3 | 285 | 69.4% |
| | example 4 | 117 | 87.4% |
| | example 5 | 262 | 71.8% |
| Marketing Insect Avoid Lamp | | 439 | 52.8% |

Any of this invention shows an excellent insect attraction avoiding percent.

Further, after investigating the insects attracted to the control apparatus in every orders, these are found to range to various kinds such as Collembola, Ephemeroptera, Orthoptera, Plecoptera, Hemiptera, Neuroptera, Trichoptera, Diptera, Hymenoptera, Coleoptera, Lepidoptera, and spiders.

(B) Window glass test

Place: Chiba city, Chiba-ken, Japan

Period: August, 1986

Two surfaces of the window glasses (3,760 $cm^2$/surface) adjacent to the north sides of the conference room are used for test. The composition of example 4 is coated with aerosol at the out side of the one window glass as a test section, while another window glass remains as it is as a control section. Adhesive sheets (23$\times$36 cm) are fixed at each central portion (1 sheet) and lower portion (2 sheets) of each sectional window glass.

Further, the light traps(30W) are arranged respectively in a room apart from the inner sides of both window glasses.

Then, at night, the captured conditions of flying insects on the adhesive sheets in each section are compared by lighting 16 fluorescent lamps(40W) and the above 2 light traps in the conference room.

As a result, the insect attraction percent of the test section VS the control section is 25.8% in adhesive sheet arranged sheet central portion and 10.5% in adhesive sheet arranged at the lower portion thereof. This shows that this invention has an excellent insect attraction avoiding function.

Further, when we observe the outer landscape through the window glasses of both sections during the daytime, the outer landscape through the test section is more clear as compared with that of the control section due to the filtration with the aid of the film formed by aerosol.

The insect attraction protectant in accordance with this invention is, as described above, able to avoid the insect attraction due to the light effectively without causing the deterioration of the residential circumference or the secondary contamination due to the chemicals.

What we claim is:

1. A method for preventing insect attraction, said method comprising preventing attraction of insects to a light source by locating a transparent synthetic resin which contains a light shielding agent therein absorbing light in the range from 200 to 500 nm wavelength relative to the light source so that the light transmitted by the light sources passes through said synthetic resin and light having a wavelength of 200 to 500 nm is prevented from passing through said transparent synthetic resin by said light shielding agent thereby preventing the attraction of insects towards the light source.

2. A method for preventing insect attraction according to claim I wherein said light shielding agent is an ultraviolet-ray absorbent.

3. A method for preventing insect attraction according to claim 1 wherein said light shielding agent is a mixture of an ultraviolet-ray absorbent and a dye.

4. A method for preventing insect attraction according to claim 1 wherein said light shielding agent is a dye.

5. A method for preventing insect attraction according to claim 1 wherein the content of table light shielding agent is 2 to 10 Wt % of the synthetic resin.

6. A method for preventing insect attraction according to claim 1 wherein the synthetic resin is an acrylic resin.

7. A method for preventing insect attraction according to claim 1 wherein the said transparent synthetic resin is a film.

8. A method for preventing insect attraction according to claim 1 wherein the said transparent synthetic resin is a plate.

9. A method for preventing insect attraction according to claim 1 wherein said transparent synthetic resin is a solution which coats the surface of a transparent material.

10. A method for preventing insect attraction according to claim 1 wherein said transparent synthetic resin is an aerosol which is sprayed on the surface of a transparent material.

* * * * *